US007603486B2

(12) United States Patent
Le et al.

(10) Patent No.: US 7,603,486 B2
(45) Date of Patent: Oct. 13, 2009

(54) NETWORK MANAGEMENT SYSTEM PROVIDING LOGIC SIGNALS OVER COMMUNICATION LINES FOR DETECTING PERIPHERAL DEVICES

(75) Inventors: Linh My Le, Mundelein, IL (US); Dwight D. Dipert, Fox River Grove, IL (US); Ellen Oschmann, Winnetka, IL (US)

(73) Assignee: 3Com Corporation, Marlborough, MA (US)

( * ) Notice: Subject to any disclaimer, the term of this patent is extended or adjusted under 35 U.S.C. 154(b) by 1356 days.

(21) Appl. No.: 10/304,218

(22) Filed: Nov. 26, 2002

(65) Prior Publication Data

US 2004/0101133 A1 May 27, 2004

(51) Int. Cl.
*H04L 29/00* (2006.01)
*H04J 99/00* (2009.01)

(52) U.S. Cl. .............................. 710/7; 710/15; 710/17; 455/133; 379/414; 379/377

(58) Field of Classification Search ................ 324/509; 709/224, 225; 370/446, 402, 248; 379/414; 326/30
See application file for complete search history.

(56) References Cited

U.S. PATENT DOCUMENTS 5,528,595 A 6/1996 Walsh et al.
5,687,174 A 11/1997 Edem et al.
5,862,338 A * 1/1999 Walker et al. ............... 709/224
5,920,698 A 7/1999 Ben-Michael et al.
6,178,514 B1 * 1/2001 Wood ......................... 713/300
6,593,768 B1 * 7/2003 Iyer et al. ..................... 326/30
6,701,443 B1 * 3/2004 Bell .......................... 713/300
6,757,369 B1 * 6/2004 Wiese et al. ............. 379/93.08
2002/0039026 A1 4/2002 Stroth et al.
2009/0029656 A1 * 1/2009 Sicard ........................ 455/91

OTHER PUBLICATIONS

AMD, Designing 10/100 Mbps Ethernet Switches with the NetPHY 4LP Device, 1999, pp. 1-15.*
http://en.wikipedia.org/wiki/Operational_amplifier http://en.wikipedia.org/wiki/CMOS.*
Sedra et al. Microelectronic Circuits, 1991, Saunders College Publishing, 3rd, pp. 747-751.*
Ho et al., The Future of Wires, Proceesings of the IEEE, 2001, IEEE, vol. 89, No. 3, pp. 490-504.*

* cited by examiner

*Primary Examiner*—Henry W. H. Tsai
*Assistant Examiner*—Cheng-Yuan Tseng
(74) *Attorney, Agent, or Firm*—McDonnell Boehnen Hulbert & Berghoff LLP

(57) ABSTRACT

A method and apparatus for detecting the presence and the type of network devices connected to a management device via transmission lines. The apparatus may include a pull-up resistor, a pull-down resistor, a filter, and a presence detector, the resistors superimposing a DC or low-frequency voltage on the transmission line. The impact, if any, of the DC voltage one communications equipment and circuitry can be reduced by a coupling that isolates the DC voltage. Similarly, the filter prevents transmitted data signals from interfering with the DC voltage level. The method and apparatus function regardless of whether the network device is functional or powered on, and different values of pull-up or pull-down resistors can be used to indicate the type of device that terminates the transmission line.

26 Claims, 5 Drawing Sheets

NETWORK MANAGEMENT SYSTEM PROVIDING LOGIC SIGNALS OVER COMMUNICATION LINES FOR DETECTING PERIPHERAL DEVICES

BACKGROUND OF THE SYSTEM

1. Field of the Invention

The present invention relates to communications networks, and, more particularly, to a method and apparatus for detecting the presence or absence of devices connected to communications networks.

2. Description of Related Art

Computer networks (such as Ethernet networks, for example) often use peripheral devices connected to a management workstation. In such networks, management hardware or software, or both, can typically detect the presence or absence of peripheral equipment only when the equipment is powered on and at least partially functional, since detection is done by recognizing received data having a known format. For example, standard Ethernet interfaces use link pulses and carrier sense for detecting equipment presence. Thus, standard detection schemes may require hardware on both ends of a communication link to have power; functional network interfaces; and good cables and connections. If a problem exists, it may be difficult to distinguish whether the cause is a bad cable, a bad connection, an unpowered device, a bad Ethernet interface, or another problem.

In commercial networks, gathering diagnostic information for equipment may require sending specially trained personnel to a remote site even if the "problem" is simply an unplugged or missing circuit board or piece of equipment. Even in cases where network devices are co-located with management devices in equipment racks, many presence detection systems cannot narrow possible problems, which can slow troubleshooting efforts. In addition, in home networks, non-technical users may find it more difficult to get adequate troubleshooting assistance if they cannot isolate the cause of a problem at a basic level. Accordingly, there is a need to more easily detect whether peripheral communications equipment is installed, powered on, or unplugged, even if the equipment is not functional or is only partially functional.

SUMMARY

In one aspect, a method and system for detecting the presence of at least one network device coupled to a management device transceiver via a coupling and a transmission line is disclosed. The coupling provides communication signals from the management device transceiver to the transmission line. The method may include applying, through an impedance, a low-frequency voltage on the transmission line side of the coupling and coupling, via a filter, the low-frequency voltage on the transmission line to a detector. Communication signals can be attenuated using the filter. If at least one network device is coupled to the management device transceiver via the transmission line, the low-frequency voltage on the transmission line side of the coupling will be at a different level than the low-frequency voltage level when no device terminates the transmission line. Using the detector, a determination can be made whether at least one network device is connected to the transmission line.

In another aspect, a circuit for detecting the presence of at least one network device on a communications network is disclosed. The circuit may include a coupling connected between a transmission line and a network transceiver and at least one impedance connected between a defined voltage and the transmission line. It may also include a presence detector and a low-pass filter coupling the transmission line to the presence detector.

These as well as other features and aspects will become apparent to those of ordinary skill in the art by reading the following detailed description with appropriate reference to the accompanying drawings.

BRIEF DESCRIPTION OF THE DRAWINGS

A fuller understanding of the foregoing may be had by reference to the accompanying drawings, wherein.

DETAILED DESCRIPTION

Figure 1:
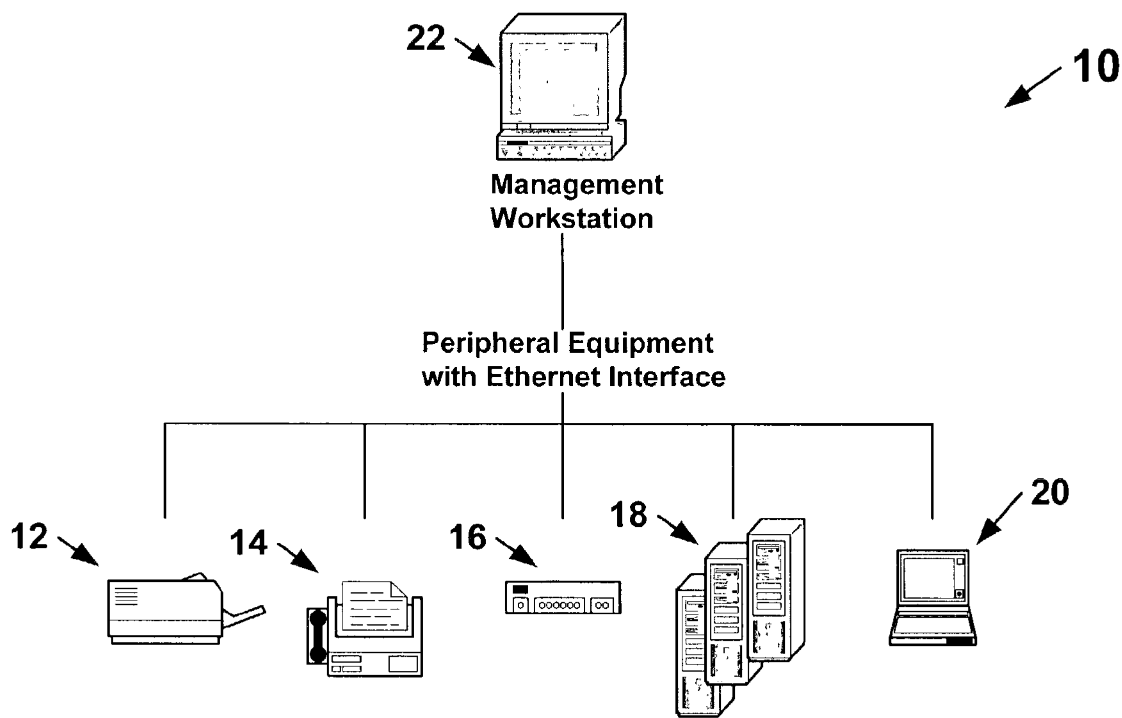
FIG. 1 is a block diagram of a network that in which the present system may be used.

Referring now to the drawings, FIG. 1 shows a network 10 in which a presence detection system may be employed. The network 10 can include a number of communications devices illustrated, for example, by a printer 12, fax machine 14, hub 16, personal computers 18, and laptop computer 20. The communications devices can be connected to each other and to management workstation 22 via Ethernet or any other suitable network communication scheme.

Briefly, the system allows for automatic detection of devices present on the network 10 regardless of whether the devices are powered on or whether their communications hardware is functional. Although FIG. 1 illustrates a network comprising individual devices connected via point-to-point wiring, the system is equally applicable for detecting components, such as modem cards, that are interconnected via a backplane. Accordingly, twisted-pair cables and standard or special connectors, such as the RJ-45 connectors shown, could be replaced by circuit traces and backplane connectors without affecting functionality of the system. Further, embodiments of the detection system work substantially without regard to communication speeds and without regard to whether peripheral hardware is functional or even powered on.

Figure 2:
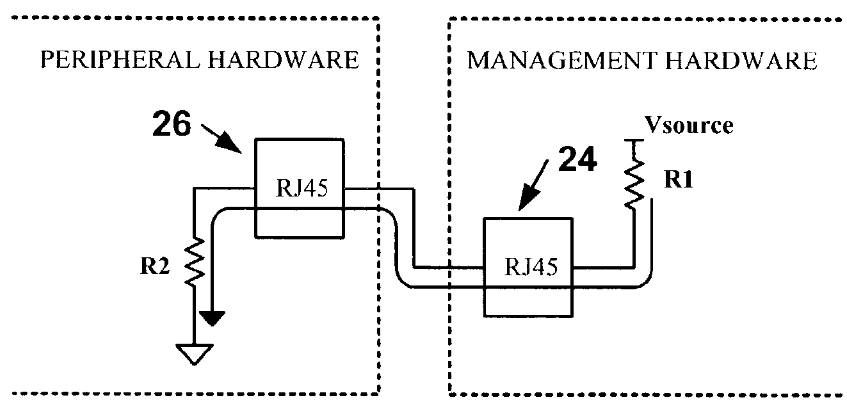
FIG. 2 is a schematic diagram of an exemplary circuit of the present system.

FIG. 2 illustrates a basic, exemplary embodiment of the system as applied to a single network device (which could be, for example, any of network devices 12-20 of FIG. 1) connected to a management hardware unit (such as management workstation 22 of FIG. 1) via an Ethernet network. A pull-up resistor R1 is connected to a low-frequency voltage $V_{source}$, on the transceiver side of a management device interface 24. When a peripheral device is connected to the management hardware, as shown by the transmission line between management device interface 24 and peripheral device interface 26, a pull-down resistor, R2, creates a voltage divider between $V_{source}$ and ground, thus changing the low-frequency bias voltage $V_{bias}$ on the transmission line. Values for R1 and R2 can be high enough to avoid interference with digital data transmitted over the network. For example, R1 and R2 may be two times greater (or more) than the source impedance of the transceiver. Additionally, R1 and R2 will typically have different values depending on the type of logic used in the communication devices (e.g., TTL, CMOS, ECL, etc.).

Figure 3:
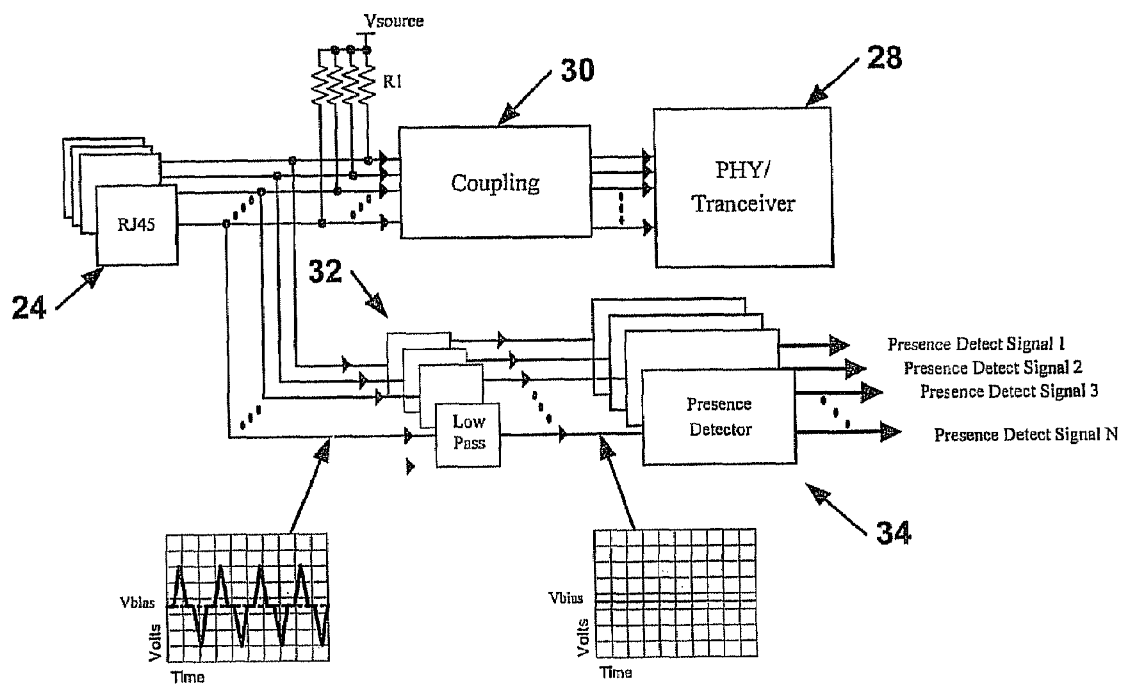
FIG. 3 is a schematic diagram of exemplary management circuitry that may be used in accordance with the present system.

FIG. 3 illustrates an exemplary presence detection scheme that may be implemented within, for example, a management workstation, a stand-alone detection device, or as a circuit within virtually any type of hardware. Typically, a physical layer device (PHY) transceiver 28 will be connected to management device interface 24 via an AC (magnetic/capacitor) coupling 30. Other couplings than the one shown could be used; as long as a coupling can isolate a transceiver from low-frequency or DC voltage effects, it is suitable for use in the system. A pull-up (or pull-down) resistor R1 can be connected to one or more conductors of a transmission line between the coupling and management device interface 24. The other end of R1 can be connected to a low-frequency voltage, $V_{source}$. The low-frequency voltage can be DC or any voltage with a low enough frequency to prevent interference with data transmission. Connection on the transmission-line side of the coupling ensures that the transceiver biasing is not degraded or compromised. For wire interfaces using differential pairs, using only one conductor of the differential pair is possible; either conductor of the differential pair may be used, as long as it is consistent with the conductor used in the peripheral devices. Of course, both conductors could also be used. As shown, the exemplary detection apparatus and method is suitable for use with any number of transmission lines/devices, 1-n.

Figure 4A:
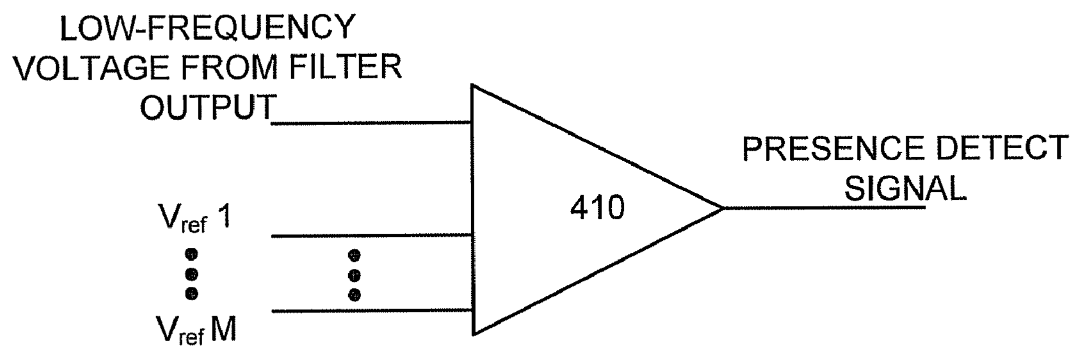
FIG. 4A is a schematic view of an exemplary presence detector including a voltage comparator.

A low-pass filter 32 can be used to couple the low-frequency voltage on a transmission line to a presence detector 34, such as a comparator or transistor, while preventing high frequency, communications signals from reaching the detector and causing false signals. As depicted in FIG. 4A, if a voltage comparator is used as a presence detector, the comparator 410 can compare the low-frequency voltage to a number, M, of different reference voltages $V_{ref}$1 to $V_{ref}$M, so that if different values of pull-down resistors are used in peripheral devices for each type of device, the detection scheme can be used to detect not only the presence of hardware, but also the type of hardware. For example, each of devices 12 through 20 in FIG. 1 could have a different value of pull-down resistance connected to the transmission line, allowing the management workstation to determine the types of devices present on the network. Low-pass filter 32 may be a simple passive RC filter, and active filter, or any other suitable filter.

Figure 4B:
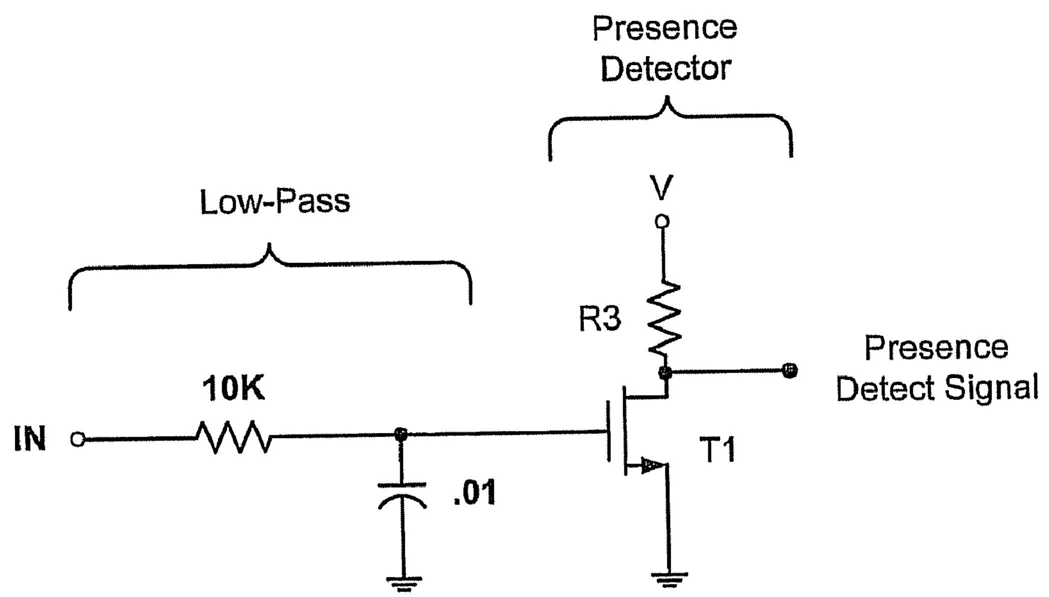
FIG. 4B is a schematic view of an exemplary presence detection circuit that may be used in accordance with the present system.

FIG. 4B illustrates in detail a low-pass filter and a presence detector that may be used in accordance with the system. The implementations shown illustrate one of many possible circuits that could be used to accomplish the same function. For example, presence detector 34 could be an IC comparator that compares the output of the low-pass filter to a reference voltage, as described above. If a voltage comparator is used, a reference voltage could come from either an external or an internal source, and it could be varied to distinguish types of equipment. For example, if a remote pull-down resistor in one type of device creates a bias voltage on a transmission line of 2.5 V and another type of device's pull-down is sized to create a voltage of 3.0 V when the device is connected, varying the reference voltage (which could be done dynamically) from just above 3.0 V to just below 3.0 V allows for detection of not only the presence of a remote device that terminates the transmission line, but also detection of device type. This example extends to more than just two different device types as well.

As illustrated, the low-pass filter of FIG. 4B has a cutoff frequency of about 10 Khz with the component values shown. When not communication device terminates the transmission line, the input of the low-pass filter will be pulled high by R1 (see FIGS. 2 and 3), which in turn will turn on the transistor of the presence detector. When the transistor is on, the presence detect signal will be pulled low. Conversely, when a device terminates the line, the output voltage of the low-pass filter will be pulled down by R2 (see FIGS. 2 and 5), turning the presence detector circuit transistor off, which allows the presence detect signal to be pulled high by resistor R3. Transistor T1 and resistor R3 (or equivalent circuitry) can be designed to drive logic of many types. Further, the geometry of transistor T1 (i.e., length and width) can be varied to alter the voltage threshold that will cause a change in the output, as is known to those of ordinary skill in the art.

Figure 5:
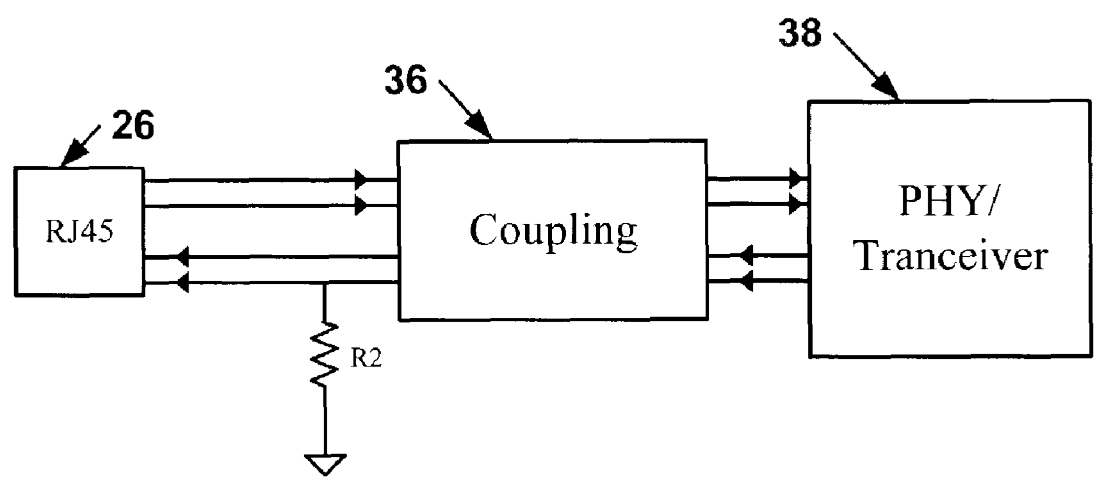
FIG. 5 is a schematic view of an exemplary presence indication circuit that may be used in accordance with the present system.

FIG. 5 illustrates a presence indicating circuit that may be used in accordance with an exemplary embodiment. As with the management device detection circuit, a resistor R2 can be connected between a coupling 36 and peripheral device interface 26 to minimize interference with a physical layer device transceiver 38. As shown, pull-down resistor R2 is connected to a single conductor of the transmit pair, although other configurations are possible. When a transmission line connects a device as shown in FIG. 5 with a management device or circuit as shown in FIG. 3, the path of FIG. 2 is completed, and the voltage that passes through low-pass filter 32, the low-frequency component of $V_{bias}$, will be reduced. For example, if $V_{source}$ is 5V and R1=R2, the low-frequency voltage that reaches presence detector 34 will be 2.5 V. Accordingly, presence detector 34 can be designed so that its output state changes when its input changes from 5 V to 2.5 V or from 2.5 volts to 5 volts. The presence detection signal for each transmission line/device 1-n can then be provided to associated hardware and/or software for diagnostic and troubleshooting purposes.

Figure 6:
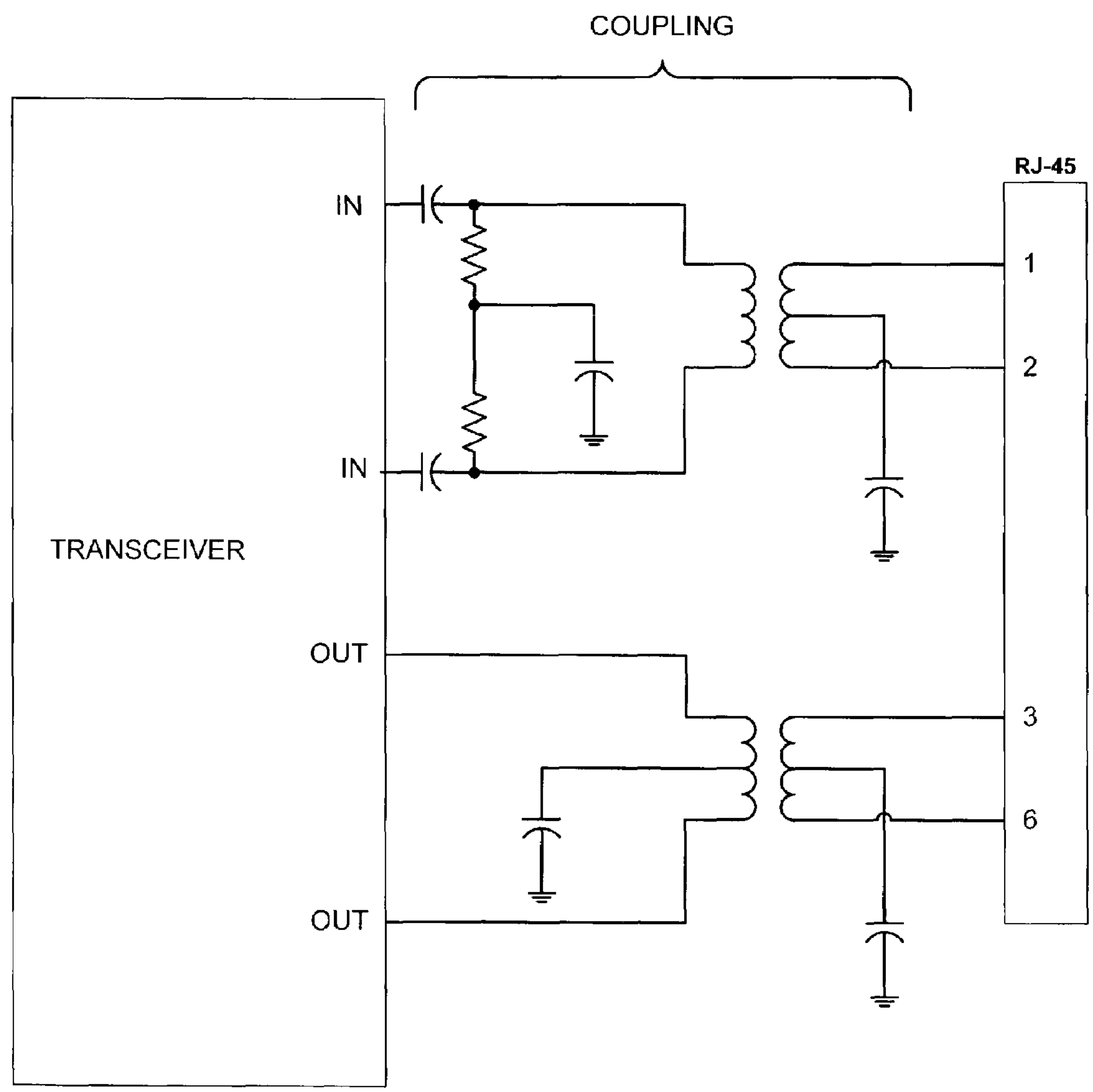
FIG. 6 illustrates an exemplary coupling that may be used in accordance with the system.

FIG. 6 illustrates a typical coupling that may be used in accordance with the system, although other configurations are possible. The coupling of FIG. 6 could represent, for example, coupling 30 and coupling 36 of FIGS. 3 and 5. For illustration purposes only, some components and connections that may be used in a typical Ethernet application are not shown. Similarly, the values of the components illustrated in FIG. 6 are not critical to the system, but typically, the resistors may be about 50Ω and the transformers may have 1:1 turns ratios. As described above, pull-up and/or pull-down resistors can be connected to any of the four conductors that connect the transformers to the RJ-45 connector without adversely affecting the output or input of the transceiver.

The embodiments described herein are merely illustrative of the principles of the present system, and various modifications may be made by those skilled in the art without departing from the spirit or scope of the claims that follow.

We claim:

1. A method for detecting the presence of at least one network device the method comprising:

receiving and transmitting data signals via a transmission line coupled to a transceiver through an isolation circuit;

applying a DC voltage to the transmission line through an impedance, wherein the DC voltage imparts a DC voltage component onto the transmission line, and wherein the magnitude of the DC voltage component is determined by a current flow through the impedance;

generating an output by passing the DC voltage component and the data signals on the transmission line through a low-pass filter coupled between the transmission line and a presence detector, the filter substantially eliminating the data signals while passing the DC voltage component; and determining using the presence detector a presence of at least one network device based on the output.

2. The method of claim 1, wherein the impedance is a resistor.

3. The method of claim 1, wherein the transceiver comprises an Ethernet physical layer device.

4. The method of claim 1, wherein the output has a predetermined magnitude when the at least one network device terminates the transmission line and the output has another predetermined magnitude when no network device terminates the transmission line.

5. The method of claim 1, wherein the at least one network device comprises an impedance connected between a defined voltage and the transmission line.

6. The method of claim 1, wherein the DC voltage component on the transmission line is lower when at least one network device terminates the transmission line than when no device is terminates the transmission line.

7. The method of claim 5, wherein the impedance connected between the defined voltage and the transmission line defines a type of the at least one network device.

8. A method for detecting the presence of at least one network device, the method comprising:

receiving and transmitting data signals via a transmission line coupled to a management device;

applying a DC voltage on the transmission line through a pull-up resistor, wherein the DC voltage imparts a DC voltage component onto the transmission line, and wherein the magnitude of the DC voltage component is determined by a current flow through the impedance;

reducing the magnitude of the DC voltage component on the transmission line using a pull-down resistor connected to the transmission line;

generating an output by passing the DC voltage component and the data signals on the transmission line through a low-pass filter coupled between the transmission line and a detector, the low-pass filter substantially eliminating the data signals while passing the DC voltage component; and making a determination, using the detector, that the at least one network device is connected to the transmission line, wherein making the determination comprises detecting the reduced magnitude of the DC voltage component based on the output.

9. The method of claim 8, further comprising outputting a presence-indicating signal in response to the determination.

10. A method for detecting the presence of at least one network device, the method comprising:

receiving and transmitting data signals via a transmission line coupled to a management device;

applying a DC voltage on a transmission line through a pull-up resistor, wherein the DC voltage imparts a DC voltage component onto the transmission line, and wherein the magnitude of the DC voltage component is determined by a current flow through the impedance;

reducing the magnitude of the DC component on the transmission line using a pull-down resistor;

generating an output by passing the DC component and data signals on the transmission line through a low-pass filter coupled between the transmission line and a detector, wherein the data signals are substantially removed by the low-pass filter; and using the detector, determining a presence and a type of at least one network device based on the output, wherein the type of the at least one network device corresponds to a predetermined magnitude of the output.

11. The method of claim 10, wherein the management device comprises the pull-up resistor, the low-pass filter, and the detector.

12. A circuit for detecting the presence of at least one network device on a communications network, the circuit comprising:

an isolation circuit connected between a transmission line and a network transceiver, wherein data signals are received and transmitted through the isolation circuit;

at least one impedance connected between a defined voltage and the transmission line, wherein the defined voltage imparts a DC voltage component onto the transmission line, and wherein the magnitude of the DC voltage component is determined by a current flow through the at least one impedance;

a presence detector for detecting a presence of at least one network device; and a low-pass filter coupled between the transmission line and the presence detector for generating an output from the DC voltage component and the data signals, wherein the low-pass filter substantially removes data signals while passing the DC voltage component wherein the presence detector detects the presence of the at least one network device based on the output of the low-pass filter.

13. The circuit of claim 12, wherein the low-pass filter comprises a resistor and a capacitor.

14. The circuit of claim 12, wherein the presence detector comprises a voltage comparator.

15. The circuit of claim 14, wherein the voltage comparator comprises a transistor.

16. The circuit of claim 12, wherein the network transceiver comprises an Ethernet physical layer device.

17. The circuit of claim 16, wherein the transmission line comprises an Ethernet connection.

18. The circuit of claim 12, wherein the presence detector comprises a MOS logic circuit.

19. The circuit of claim 12, wherein the presence detector comprises an analog comparator.

20. The circuit of claim 12, wherein the impedance comprises a pull-up resistor and wherein the defined voltage is a positive DC voltage.

21. A system for indicating and detecting the presence of at least one network device on a communications network, the system comprising:

a first isolation circuit connected between a transmission line and a management device transceiver, wherein data signals are transmitted and received through the first isolation circuit;

a second isolation circuit connected between the transmission line and a network device transceiver, wherein the data signals are transmitted and received through the second isolation circuit;

at least one pull-up resistor connected between a first defined voltage and the transmission line, wherein the first defined voltage imparts a DC voltage component onto the transmission line, and wherein the magnitude of the DC voltage component is determined by a current flow through the at least one pull-up impedance;

a presence detector for detecting a presence of the at least one network device;

a low-pass filter coupled between the transmission line and the presence detector for generating an output from the DC voltage component and the data signals, the low-pass filter substantially eliminating the data signals while passing the DC voltage component; and at least one pull-down resistor connected between a second defined voltage and the transmission line, wherein the at least one pull-down resistor reduces the magnitude of the DC voltage component when the at least one network device transceiver is coupled to the management device transceiver, wherein the presence detector detects the presence of the at least one network device based on the output of the low-pass filter.

22. The system of claim 21, wherein the first isolation circuit comprises one or more transformers.

23. The system of claim 21, wherein the first defined voltage is a positive DC voltage.

24. The system of claim 21, wherein the second isolation circuit comprises one or more transformers.

25. The system of claim 21, wherein the second defined voltage is approximately 0 volts.

26. A system for indicating and detecting the presence of at least one network device on a communications network, the at least one network device comprising a transmission line interface, the system comprising:

a first transformer circuit connected between a transmission line and a management device transceiver, wherein data signals are transmitted and received through the first transformer circuit;

at least one pull-up resistor connected between a first defined voltage and the transmission line, wherein the first defined voltage imparts a DC voltage component onto the transmission line, and wherein the magnitude of the DC voltage component is determined by a current flow through the at least one pull-up impedance;

a presence detector for detecting a presence of the at least one network device;

a low-pass filter coupled between the transmission line and the presence detector for generating an output from the DC voltage component and the data signals, the low-pass filter substantially eliminating the data signals while passing the DC voltage component;

a second transformer circuit connected between the transmission line interface and a network device transceiver, wherein the data signals are transmitted and received through the second transformer circuit; and at least one pull-down resistor connected between a second defined voltage and the transmission line, the at least one pull-down resistor reducing the magnitude of the DC voltage component when the at least one network device transceiver is coupled to the management device transceiver, wherein the presence detector detects the presence of the at least one network device based on the output of the low-pass filter.

* * * * *

UNITED STATES PATENT AND TRADEMARK OFFICE

CERTIFICATE OF CORRECTION

PATENT NO. : 7,603,486 B2
APPLICATION NO. : 10/304218
DATED : October 13, 2009
INVENTOR(S) : Le et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1784 days.

Signed and Sealed this

Fifth Day of October, 2010

David J. Kappos
*Director of the United States Patent and Trademark Office*